Patented Oct. 22, 1940

2,218,655

UNITED STATES PATENT OFFICE 2,218,655

PROCESS FOR PRODUCING INSOLUBLE TITANATES

James H. Peterson, Wilmington, Del., assignor to E. I. du Pont de Nemours & Company, Wilmington, Del., a corporation of Delaware No Drawing. Application June 15, 1938, Serial No. 213,835

13 Claims. (Cl. 23—51)

This invention relates to the production of pigments containing alkaline earth metal titanates, and more particularly to a process for the preparation of alkaline earth metal titanates suitable for use as pigments, either directly or after calcination.

Previously, alkaline earth metal titanates have been prepared by a furnace process, i. e., by heating at relatively high temperatures, usually in excess of 750° C., a dry mixture of titanium oxide with a suitable alkaline earth compound, such as the carbonate. Calcination temperatures of this order are necessary to the obtainment of a reasonably complete reaction. However, it has been found that from the standpoint of pigment properties, these furnace products are not of optimum quality, a possible explanation being that the conditions necessary to effect chemical reaction, in the dry state, do not coincide with the conditions necessary to develop maximum pigment quality.

I have found that alkaline earth metal titanate compositions useful directly as pigments may be conveniently obtained by reaction in the wet way and independently of a calcination step, and that, if desired, the resultant product may be subsequently subjected to calcination at temperatures suitably conducive to development of particular pigmentary properties.

Accordingly, it is among the objects of my invention to provide a process for the preparation of pigments containing alkaline earth metal titanates; to provide a process wherein the preparation of such pigments is effected in the wet way and at relatively low temperatures compared with those furnace processes employed in prior processes; and to provide a process from which the titanate compositions obtained are particularly adapted for pigment use. A still further object of the invention includes the production of alkaline earth metal titanate compositions which, even in the raw or uncalcined state, have certain advantages for pigment use, and are particularly adapted to subsequent calcination, independently of the formation reaction and at any suitable calcination temperature, whereby the ultimate pigment properties desired in the titanate can be easily and effectively developed.

These and other objects and advantages are accomplished in my invention, which broadly comprises preparing alkaline earth metal titanate-containing compositions by heating or digesting, at relatively low reaction temperatures and in the presence of water in liquid form, a mixture of a titanium-oxygen compound and an alkaline earth metal hydroxide or a suitable compound or combination of compounds by which an alkaline earth metal hydroxide becomes formed during the heating process, and continuing the digestion until conversion to the desired degree has taken place.

In a more restricted embodiment, the invention comprises preparing pigments comprising relatively insoluble alkaline earth metal titanate compositions, by heating or digesting together, while in the form of an aqueous slurry or paste, and at relatively low temperatures, a mixture of titanium oxide or hydrated titanium oxide and an alkaline earth metal hydroxide or compound which, under the conditions prevailing in the process, will form an alkaline earth metal hydroxide, and continuing the digestion until the reaction is complete. The raw pigment thus obtained is of excellent fineness and perfect texture and is of sufficiently high tinting strength so that it may be used directly for many pigment purposes. In general, the tinting strength of the raw pigment is at least 33% and may be as high as 65% or more of the maximum strength developed on calcination at a suitable temperature, e. g., at 950° C. in the case of barium titanate composition. The raw pigment is of comparatively low density and this is of advantage for some purposes. When the raw pigment is calcined at a suitable temperature, there is a marked increase in density and tinting strength and a pigment is obtained of excellent color, texture and covering power.

In one practical and preferred adaptation of my invention involving the production of an insoluble barium titanate composition which in calcined or uncalcined state is useful as a pigment, I digest at the boil a water slurry mixture of titanium oxide or hydrated titanium oxide and barium hydroxide for a relatively short period of time and until reaction is completed and a precipitate is obtained consisting of barium titanate, with or without excess TiO$_2$. I then filter off the aqueous slurry remaining, dry the barium titanate end product, and employ the same directly as a pigment, or calcine it at a temperature ranging from about 700 to 1100° C. to further develop its pigment properties, the temperature and time of calcination being adjusted to develop the pigment properties desired. After calcination, the barium titanate pigment may be finished by either wet or dry grinding in the usual and well known manner. Preferably, however, I resort to wet grinding. For certain coating composition applications, any residual basicity can then be eliminated easily by neutralizing with a suitable acid prior to subjecting the ground pigment slurry to final filtration and drying.

In order that the invention may be more clearly understood, the following examples are given in illustration only:

EXAMPLE I

Barium titanate

Hydrated titanium oxide, washed free of sulfate, was slurried in water to form a slurry of a concentration equivalent to approximately 15% by weight of titanium oxide. Barium hydroxide $(Ba(OH)_2 \cdot 8H_2O)$ was then added to this slurry in a molecular ratio of $Ba(OH)_2:TiO_2=1:1$, and the slurry heated to boiling and held at the boil for approximately one hour. Essentially complete reaction took place during the heating period with the formation of a precipitate of barium titanate. The slurry was then filtered and the product dried, after which it was calcined at a temperature of 950° C. for a period of approximately one hour.

The product thus obtained comprises crystalline barium titanate $(BaTiO_3)$, as indicated by its X-ray diffraction pattern consisting of sharply defined lines of $BaTiO_3$. The density of this raw pigment was 5.43, which increased on calcination to 5.94.

EXAMPLE II

Strontium titanate

The steps of Example I were duplicated, save that in lieu of barium hydroxide, strontium hydroxide was employed. As a result, strontium titanate $(SrTiO_3)$ was obtained. The tinting strength of the raw pigment was 41% of that developed on calcination. The density was 4.42 for the raw pigment and 5.03 for the calcined.

EXAMPLE III

Barium titanate—Modified titanium oxide

A slurry of pigment grade titanium oxide was made by vigorously stirring 720 parts of titanium oxide into 1800 parts of water. To this slurry was added 360 parts of $Ba(OH)_2 \cdot 8H_2O$ and the slurry then heated to boiling and maintained at the boiling point for two hours. The slurry was then filtered and washed repeatedly to remove unreacted barium hydroxide. Analysis of the wash water showed that 96.5% of the barium hydroxide had reacted with the titanium oxide. The washed product, containing about 7 mols $TiO_2$ per mol $BaTiO_3$ was then dried and pulverized, the titanate-modified pigment thus obtained being capable of direct use without further processing. The tinting strength of this raw pigment was 87–89% of that of the calcined $TiO_2$ used as starting material. It forms an excellent pigment, either in the raw state or after calcination.

EXAMPLE IV

Calcium titanate

To 1000 parts of a slurry of hydrated titanium oxide containing the equivalent of 240 parts of titanium oxide was added 1700 parts of a slurry of hydrated lime containing the equivalent of 168 parts of CaO. This slurry was then placed in an autoclave equipped with a stirrer, the autoclave closed and slowly heated, with constant stirring, to a temperature of about 145° C. and under the pressure developed in the closed system (about 60 lbs. per square inch), the reactants being maintained under these conditions for approximately 20 minutes. During this heating complete reaction took place forming calcium titanate $(CaTiO_3)$, which on examination by X-ray diffraction methods, showed only the diffraction lines characteristic of calcium titanate. The slurry of calcium titanate was then filtered and dried, after which it was calcined at 950° C. for approximately one hour to further develop its pigment properties. On calcination, the density increased from 3.66 to 3.79. The tinting strength of the raw pigment was 61.3% of that developed on calcination at 950° C.

As will be noted, titanate formation in accordance with my process may be effected by my process under atmospheric or superatmospheric pressures. In the instance of barium and strontium titanate preparation, I preferably and conveniently prepare them by reacting the hydroxides of the alkaline earth metals barium or strontium with the titanium-oxygen compound at about the boiling point of the water under atmospheric conditions. In preparing calcium titanate, however, I have found it preferable to heat the water slurry of calcium hydroxide and titanium-oxygen compound to temperatures above the boiling point of the water at atmospheric pressure, in order to speed up the reaction rate. Again, while specific temperatures have been employed in the foregoing examples, it will be evident that these temperatures may be varied considerably providing the reaction time is adjusted so that the reaction is completed to the desired degree. In general, it will be found that the temperatures to which the reactants must be heated during digestion to obtain satisfactory conversions within reasonable time limits will vary with the reactants employed, that is, with the character of the titanium-oxygen compound utilized and with the alkaline earth metal hydroxide present. Accordingly, it is only necessary to explain that the conversion rate increases with the digestion temperature and that, for any given reaction mixture, the most desirable temperature to use will be found by raising the temperature until conversion proceeds at the desired rate and continuing at that temperature until the reaction has been completed or has been completed to the desired degree. Since reaction calls for the presence of liquid water, when the reaction rate at 100° C. is considered too slow, than it is preferable to carry out the reaction in an autoclave or other closed vessel so that the water may be kept in liquid form while the temperature is raised to the point necessary to complete the reaction in a practicable time. There is no upper temperature limit except the critical temperature for water (374° C.) and no upper pressure limit except that imposed by the strength of the apparatus used.

In the instance of barium and strontium titanate preparation using hydrated titanium oxide, heating at the boiling point of the slurry is a convenient reaction temperature, although the reaction takes place at about 65–70° C. but at a much slower rate than at 90–100° C. When calcined titanium oxide is used, higher temperatures are preferably employed in order to obtain a more rapid and complete reaction. In the instance of calcium titanate preparation, even though hydrated titanium oxide of the type described in Example I is utilized, it will be found that the rate is quite slow at a temperature of 100° C., but that higher temperatures, of the order of about 140° C., will give a relatively complete reaction in a relatively short time.

Again, the time during which the reactants are to be heated should be adjusted with due regard to the reactants present and to the temperature of digestion. Thus, the reaction in the formation of barium titanate, as described in Example I, is substantially complete after boiling the slurry for about 15 minutes and a heating period of an hour will usually suffice to complete that reaction. Generally, it will be found that the heating period required will depend on the reactivity of the reactants and will vary also with the temperatures to which the reactants are heated.

As shown by the above examples, I preferably obtain the alkaline earth metal titanate compositions of the present invention by reacting through digestion at elevated temperatures a mixture of alkaline earth metal hydroxide and a titanium-oxygen compound in aqueous liquid media, such as water. While the latter is preferably employed in the invention because of its ready availability and adaptability, it will be understood that other suitable liquid media for effecting such digestion at elevated temperatures may also be employed, as may water containing or diluted with other solutes, such as alcohol, sodium chloride, etc. The amount of liquid media employed is subject to variance and may be, as desired, relatively large or small. For most purposes, however, I have found that the use of a quantity of liquid media sufficient to maintain the reactants in a surry condition during digestion at any desired elevated temperature and for the purpose of effecting the desired conversions, will effect the desired and beneficial results of the invention. The essential requirement is that enough water be present to at least wet the reactants and that the temperature and pressure conditions are such that the water remains in liquid form.

As shown by the foregoing Examples I, II and IV, hydrated titanium oxide has been conveniently used because of its ready commercial availability. Ortho or metatitanic acid precipitated by neutralization of titanium salt solutions may likewise be employed. Similarly, as shown in Example III, calcined, commercially available pigment grade titanium oxide may also be used. When the latter is employed, it will be found the reaction proceeds more slowly and complete reaction is not so readily obtained unless the temperature is considerably higher. Thus, when calcined titanium oxide was substituted for the hydrated titanium oxide of Example I, it was found that although the reaction was approximately only 25% complete, after boiling for a period of two hours, the product obtained (containing unreacted $TiO_2$) possessed valuable pigment properties, both before and after calcining. The calcined titanium oxide is less reactive than the hydrated titanium oxide and if more complete reaction is desired, I have found it desirable to heat the water slurry of reactants at higher temperatures and under pressure by use of an autoclave or similar closed apparatus which will be capable of withstanding the pressures developed on heating, continuing the heating until the reaction is completed to the desired degree.

As indicated in Example I, the hydrated titanium oxide employed is preferably washed free of sulfate. Usually the hydrated titanium oxide obtained by the hydrolysis of a titanium sulfate solution contains some chemically combined or firmly held sulfuric acid which is not removed by simple washing with water. In order to obtain a product which is relatively free from sulfuric acid, the hydrated titanium oxide slurry may be neutralized with ammonium hydroxide to a pH of about 7.2 and then washed until substantially sulfate-free. Although I preferably resort to such procedures in order to obtain optimum benefits in the invention, I may omit this step since the presence of the sulfate may be offset by employing an excess of the alkaline earth hydroxide, such as barium hydroxide, in order to convert the sulfate present to the corresponding alkaline earth sulfate. If an extended pigment is desired, additional quantities of sulfuric acid may be added to obtain a titanate pigment extended with larger amounts of the alkaline earth metal sulfate.

Again, while I have employed specific ratios of titanium oxide pigment to alkaline earth metal hydroxides in the foregoing examples, it will be understood that in order to insure complete conversion of all the titanium oxide or hydrated titanium oxide to the alkaline earth metal titanate, a slight excess of the alkaline earth metal hydroxide, such as barium hydroxide, may be used. This excess, however, need be only of the order of a few per cent, so that the preferred ratios for use in this invention range from about $\frac{1}{20}$ mol to about 1.1 mol of alkaline earth metal hydroxide per mol of $TiO_2$. When more than one mol of the hydroxide is used, or when the digestion is not continued until the hydroxide is completely converted to titanate, then the unconverted hyroxide should be removed by washing before calcination, if it is desired to avoid reduction of pigmenting power of the finished product. In such event, the excess of hydroxide so recovered may be returned to the process for reuse. While the use of an excess of alkaline earth metal hydroxide is contemplated, it is not essential, since with suitable adjustment time and temperature of digestion, the reaction goes to practical completion without such excess.

Similarly, and as illustrated in Example III, my invention is useful in the preparation of titanium oxide pigments modified with varying amounts of alkaline earth metal titanates, especially barium titanate, by employing an excess of titanium oxide in the process, e. g., say, from 1–20 mols of $TiO_2$ per mol of titanate. The pigment thus obtained, as may all the titanate pigments produced in my invention, may be directly used without further processing. While this is true, I preferably resort to calcination treatment when it is desired to increase and develop further the pigmentary power of the titanates so produced. Thus the modified pigment prepared in accordance with Example III, when calcined at about 900° C. and containing about 20% by weight of combined barium oxide, exhibits about 87% of the tinctorial power of the original unmodified pigment. When these pigments are substituted for titanium oxide in mixed pigment linseed oil outside paints, it will be found that they possess definitely greater resistance to chalking than the unmodified titanium oxide.

In instances where the titanate pigments obtained in my invention are subjected to calcination temperatures ranging from about 700° C. to about 1100° C., and preferably from about 900° to about 1050° C., are utilized, the time and temperature of calcination used in any specific case will depend on the specific reactants present, on the use to which the product is to be put and on the pigment properties it is desired to develop.

While the invention has been described in its preferred embodiment involving the preparation of pigments containing specific alkaline earth titanates, it is to be understood that the preparation of mixed titanates in which two or more alkaline earth titanates are prepared by using a mixture of alkaline earth hydroxides or their equivalents as the reactants, is contemplated.

While the invention has been illustratively described by methods employing alkaline earth metal hydroxides directly as starting materials, it will be understood that other sources of alkaline earth metal hydroxide may be used in the process, whereby the hydroxide is formed in situ for reaction with the titanium-oxygen compound. Thus, in the procedure given in Example I, I described the preparation of barium titanate using barium hydroxide. Obviously, if a solution of barium sulfide should be employed as a starting material, prepared for example in the manufacture of lithopone, barium titanate will be found to form in the process, in accordance with the following equations:

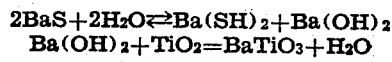
$$2BaS + 2H_2O \rightleftharpoons Ba(SH)_2 + Ba(OH)_2$$
$$Ba(OH)_2 + TiO_2 = BaTiO_3 + H_2O$$

The barium acid sulfide which is formed as a by-product may also be used in the preparation of barium titanate as represented by the following equation:

$$Ba(SH)_2 + 2NaOH + TiO_2 = BaTiO_3 + 2NaSH + H_2O$$

The preparation can be conveniently carried out in a single step by adding sodium hydroxide to the slurry of titanium oxide in the barium sulfide solution. The reaction then may be represented by the following equation:

$$BaS + NaOH + TiO_2 = BaTiO_3 + NaSH$$

Barium hydroxide may be formed in the slurry during the heating period using water soluble barium salts such as the chloride or acetate plus the chemically equivalent amount of sodium hydroxide as illustrated by the following equation:

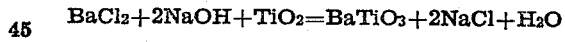
$$BaCl_2 + 2NaOH + TiO_2 = BaTiO_3 + 2NaCl + H_2O$$

Barium titanate prepared in this manner is identical in characteristics with that prepared directly from barium hydroxide.

In the same manner, compounds of strontium and calcium, such as strontium sulfide or calcium sulfide, etc. may be utilized, which, under the conditions prevailing in the invention, form the desired alkaline earth metal hydroxide in situ for reaction with the titanium-oxygen compound. Since calcium hydroxide is very plentiful and readily available, it is obvious that in the practical adaptation of my invention, resort to this latter method of forming the calcium hydroxide in situ need not be had, and accordingly, the method illustrated in Example IV herein comprises my preferred embodiment. In any event, should the calcium sulfide be employed as a starting material, it will be found necessary, as in the instance of said Example IV, to resort to a pressure operation.

From the foregoing, it will be apparent that my invention affords a process for the preparation of alkaline earth metal titanate pigments at relatively low temperatures, the titanates so prepared being obtained independently of a calcination step and adapted for use without such treatment; or such products can be calcined at any desired temperature, independently of the formation reaction, whereby an effective and desirable control can be effected over the development of satisfactory pigment properties. Also, the titanate pigments prepared in accordance with my process will exhibit better color than those prepared by prior processes, which improved color is of definite advantage when such products are employed for pigmentary purposes.

The term "titanium-oxygen compound," as used herein and in the appended claims, includes hydrated titanium oxide, as prepared by hydrolysis of titanium salt solutions, ortho or metatitanic acid and titanium dioxide per se. Variation in the character of the titanium-oxygen compound employed will be found to result in differences in the properties of the pigment obtained, such as in particle size and oil absorption characteristics.

I claim as my invention:

1. A process for producing a relatively insoluble alkaline earth metal titanate pigment, which comprises reacting a water-wet mixture of a titanium-oxygen compound from the group consisting of titanium oxide, hydrated titanium oxide, orthotitanic acid and metatitanic acid, with an alkaline earth metal hydroxide, at an elevated temperature ranging from substantially 65° C. to below substantially 374° C., and during conversion of the reactants maintaining the same in substantially aqueous slurry condition.

2. A process for producing a relatively insoluble alkaline earth metal titanate pigment, which comprises reacting a water-wet mixture of a titanium-oxygen compound from the group consisting of titanium oxide, hydrated titanium oxide, orthotitanic acid and metatitanic acid, with an alkaline earth metal hydroxide, at an elevated temperature ranging from substantially 90° C. to about 145° C., and during conversion of the reactants maintaining the same in substantially aqueous slurry condition.

3. A process for producing a relatively insoluble alkaline earth metal titanate pigment which comprises reacting a water-wet mixture of a titanium-oxygen compound from the group consisting of titanium oxide, hydrated titanium oxide, orthotitanic acid and metatitanic acid, with an alkaline earth metal hydroxide, at an elevated temperature ranging from substantially 65° C. to below substantially 374° C., during conversion of the reactants maintaining the same in substantially aqueous slurry condition, recovering the resulting alkaline earth metal titanate, and subjecting the same to calcination to further develop its pigment properties.

4. A process for producing a relatively insoluble alkaline earth metal titanate pigment which comprises reacting by digesting at the boil an aqueous slurry mixture of a titanium-oxygen compound from the group consisting of titanium oxide, hydrated titanium oxide, orthotitanic acid and metatitanic acid, with an alkaline earth metal hydroxide, and throughout conversion of said reactants maintaining the same in aqueous slurry condition.

5. A process for producing a relatively insoluble alkaline earth metal titanate pigment which comprises reacting by digesting at the boil and at temperatures ranging from substantially 90° C. to 145° C. an aqueous slurry mixture of a titanium-oxygen compound from the group consisting of titanium oxide, hydrated titanium oxide, orthotitanic acid and metatitanic acid, with an in-situ-formed alkaline earth metal hydroxide during conversion of said reactants maintaining the same in aqueous slurry condition, recovering the resulting alkaline earth metal titanate, and then calcining the same to further develop its pigment properties.

6. A process for producing a relatively insoluble barium titanate pigment, which comprises reacting a water-wet mixture of a titanium-oxygen compound from the group consisting of titanium oxide, hydrated titanium oxide, orthotitanic acid and metatitanic acid, with barium hydroxide, effecting said reaction at a temperature ranging from substantially 65° C. to 100° C. and during conversion of said reactants maintaining the same in aqueous slurry condition.

7. A process for producing a relatively insoluble strontium titanate pigment, which comprises reacting a water-wet mixture of a titanium-oxygen compound from the group consisting of titanium oxide, hydrated titanium oxide, orthotitanic acid and metatitanic acid, with strontium hydroxide, effecting said reaction at a temperature ranging from substantially 65° C. to 100° C. and during conversion of said reactants maintaining the same in aqueous slurry condition.

8. A process for producing a relatively insoluble calcium titanate pigment, which comprises reacting a water-wet mixture of a titanium-oxygen compound from the group consisting of titanium oxide, hydrated titanium oxide, orthotitanic acid and metatitanic acid, with calcium hydroxide, effecting said reaction at a temperature ranging from about 100° C. to below substantially 374° C., and during conversion of said reactants maintaining the same in aqueous slurry condition.

9. A process for producing a relatively insoluble calcium titanate pigment, which comprises reacting a water-wet mixture of a titanium oxygen compound from the group consisting of titanium oxide, hydrated titanium oxide, orthotitanic acid and metatitanic acid, with calcium hydroxide, conducting said reaction at a superatmospheric pressure and at a temperature ranging from about 100° C. to below substantially 374° C., and throughout conversion of said reactants maintaining the same in aqueous slurry condition.

10. A process for producing a relatively insoluble barium titanate pigment which comprises reacting by digesting at the boil an aqueous slurry mixture of a titanium-oxygen compound from the group consisting of titanium oxide, hydrated titanium oxide, orthotitanic acid and metatitanic acid, with barium hydroxide, throughout conversion of said reactants maintaining the same in aqueous slurry condition and recovering and drying the resulting pigment product.

11. A process for producing a relatively insoluble strontium titanate pigment which comprises reacting by digesting at the boil an aqueous slurry mixture of a titanium-oxygen compound from the group consisting of titanium oxide, hydrated titanium oxide, orthotitanic acid and metatitanic acid, with strontium hydroxide, throughout conversion of said reactants maintaining the same in aqueous slurry condition and recovering and drying the resulting pigment product.

12. A process for producing a relatively insoluble calcium titanate pigment which comprises reacting by digesting at the boil and at a superatmospheric pressure a water-wet mixture of a titanium-oxygen compound from the group consisting of titanium oxide, hydrated titanium oxide, orthotitanic acid and metatitanic acid, with calcium hydroxide, throughout conversion of said reactants maintaining the same in aqueous slurry condition, recovering the resulting calcium titanate product and subjecting the same to calcination to further develop its pigment properties.

13. A process for producing a relatively insoluble alkaline earth metal titanate pigment which comprises reacting a water-wet mixture of a titanium-oxygen compound from the group consisting of titanium oxide, hydrated titanium oxide, orthotitanic acid and metatitanic acid, with an alkaline earth metal hydroxide, in the ratio of from about $\frac{1}{20}$ mol to about 1.10 mol of alkaline earth metal hydroxide per mol of $TiO_2$ present, conducting said reaction at a temperaranging from substantially 90° C. to below substantially 374° C., and for a period of time sufficient to effect substantially complete titanate formation, throughout conversion thereof maintaining the reactants in aqueous slurry condition, and thereafter recovering the resulting alkaline earth metal titanate and subjecting the same to calcination to further develop its pigment properties.

JAMES H. PETERSON.